(12) United States Patent
Krishnan et al.

(10) Patent No.: US 10,983,969 B2
(45) Date of Patent: Apr. 20, 2021

(54) METHODS AND SYSTEMS FOR MAPPING FLATTENED STRUCTURE TO RELATIONSHIP PRESERVING HIERARCHICAL STRUCTURE

(71) Applicant: BOOMI, INC., Round Rock, TX (US)

(72) Inventors: Ravikiran Krishnan, San Mateo, CA (US); Zeyu Su, San Mateo, CA (US); Suchitra Ramani, San Mateo, CA (US); Bharath Maryada, San Mateo, CA (US); Alon Goldshuv, San Mateo, CA (US); Ravi Shankar, San Mateo, CA (US); Deepak Chandrasekar, San Mateo, CA (US); Balaji Soundararajan, San Mateo, CA (US); Ayush Parashar, San Mateo, CA (US)

(73) Assignee: BOOMI, INC., Round Rock, TX (US)

( * ) Notice: Subject to any disclaimer, the term of this patent is extended or adjusted under 35 U.S.C. 154(b) by 109 days.

(21) Appl. No.: 16/278,195

(22) Filed: Feb. 18, 2019

(65) Prior Publication Data
US 2020/0265025 A1 Aug. 20, 2020

(51) Int. Cl.
| | | |
|---|---|---|
| *G06F 3/048* | (2013.01) | |
| *G06F 16/21* | (2019.01) | |
| *G06F 3/0481* | (2013.01) | |
| *G06N 3/02* | (2006.01) | |
| *G06N 7/00* | (2006.01) | |
| *G06F 16/185* | (2019.01) | |

(52) U.S. Cl.
CPC .......... *G06F 16/213* (2019.01); *G06F 3/0481* (2013.01); *G06F 16/185* (2019.01); *G06F 16/212* (2019.01); *G06N 3/02* (2013.01); *G06N 7/005* (2013.01)

(58) Field of Classification Search
CPC ......... G06F 3/0481; G06F 16/211–215; G06F 17/30; G06F 16/212; G06F 16/213
See application file for complete search history.

(56) References Cited

U.S. PATENT DOCUMENTS

| | | |
|---|---|---|
| 6,874,141 B1 | 3/2005 | Swamy et al. |
| 7,003,722 B2 | 2/2006 | Rothchiller et al. |
| 8,086,959 B2 | 12/2011 | Rothschiller et al. |

(Continued)

*Primary Examiner* — Claudia Dragoescu
(74) *Attorney, Agent, or Firm* — Krishnendu Gupta; Nikhil Patel (57) ABSTRACT

A method and a system for mapping a flattened data structure into a relation preserving data structure is disclosed. The method includes receiving a flattened schema comprising a plurality of columns. The method includes receiving a plurality of user inputs from a user. The plurality of user inputs comprises a plurality of identifiers. The method includes defining a sample target hierarchical schema based on user inputs. The method includes preparing a nested hierarchical structure corresponding to the sample target hierarchical schema in a User Interface (UI) representation. The nested hierarchical structure comprises a plurality of nodes with corresponding identifiers and relationships of the plurality of nodes. The method includes performing an Artificial Intelligence (AI) based mapping of columns of the flattened schema to respective nodes of the plurality of nodes of the nested hierarchical structure. The method further includes generating a target hierarchical schema based on AI based mapping.

18 Claims, 8 Drawing Sheets

(56) References Cited

U.S. PATENT DOCUMENTS

| | | |
|---|---|---|
| 9,977,600 B1 | 5/2018 | Sanvido et al. |
| 2006/0206502 A1* | 9/2006 | Gaurav ................. G06F 16/258 |
| 2008/0243772 A1 | 10/2008 | Fuxman et al. |
| 2013/0238669 A1* | 9/2013 | Zhou ..................... G06F 16/254 |
| | | 707/803 |
| 2016/0321307 A1* | 11/2016 | Dingman ................ G06F 16/25 |

* cited by examiner

METHODS AND SYSTEMS FOR MAPPING FLATTENED STRUCTURE TO RELATIONSHIP PRESERVING HIERARCHICAL STRUCTURE

TECHNICAL FIELD

Embodiments of the disclosure relate generally to databases and, more particularly to, a method and a system for mapping a flattened structure to a relationship preserving hierarchical structure.

BACKGROUND

The constant development in the field of computer science has led to the evolution of a branch for understanding data behavior and extract knowledge, known as data science. Data science is an interdisciplinary field that uses scientific methods, processes, algorithms and systems to extract knowledge and insights from data in various forms, including both structured and unstructured data. The data science unifies the concepts of statistics, data analysis, machine learning, and their related methods in order to analyze the data phenomena. The data science works similar to data mining, which includes a process of discovering patterns in large data sets involving methods at the intersection of machine learning, statistics, and database systems.

One of the important aspects of the data science, that helps in extracting knowledge from the data, is storage of data in database systems. The data stored in the database may be of two kinds, where the first kind of data storage is where the relation between multiple data fields is preserved, such as nested data or hierarchical data, and another kind of data storage is in form of flattened data in a single table in which all of the records are stored as single rows of data typically separated by delimiters such as tabs or commas. The data storage structure plays a vital role in the behaviour of data and hence few storage types are preferred over others, for example, nested structure is preferred over the flattened structure as the flattened structure provides minimal data security and consistency. Moreover, the searching process in the flattened structure is also cumbersome as compared to the nested structure. Hence, in many scenarios, it is needed to convert flattened data into nested data, which is configured to preserve relationship between the data fields and enables the dataset with high security and provision to store large datasets.

Currently, there are no automated methods available to convert the flattened structure to a nested structure and the conversion of the flattened schema to the hierarchical structure needs to be carried out manually. The manual process is time consuming and non-reliable as there is a huge scope for human errors. Also, the manual process proves impractical for large datasets in which thousands of fields are there in the flattened structure and thousands of fields or nested objects are available in the nested structure.

In the light of the above discussion, there remains a need in the art for techniques that can facilitate conversion of the flattened structure to the nested structure with minimum or no manual intervention while preserving all the relationships between the data fields.

SUMMARY

Various embodiments of the present disclosure provide a method and a system for mapping a flattened structure to a relationship preserving hierarchical structure.

In an embodiment, a method is disclosed. The method includes receiving a flattened schema comprising a plurality of columns. The method includes receiving a plurality of user inputs from a user. The plurality of user inputs comprises a plurality of identifiers. The method includes defining a sample target hierarchical schema based on user inputs. The method includes preparing a nested hierarchical structure corresponding to the sample target hierarchical schema in a User Interface (UI) representation. The nested hierarchical structure comprises a plurality of nodes with corresponding identifiers of the plurality of identifiers. The method includes performing an Artificial Intelligence (AI) based mapping of plurality of columns of the flattened schema to respective nodes of the plurality of nodes of the nested hierarchical structure. The method further includes generating a target hierarchical schema based on AI based mapping.

In another embodiment, a server system is disclosed. The server system comprises a memory to store instructions and a processor to execute the stored instructions in the memory and thereby cause the server system to receive a flattened schema comprising a plurality of columns. The server system is further caused to receive a plurality of user inputs from a user. The plurality of user inputs comprises a plurality of identifiers. The server system is further caused to define a sample target hierarchical schema based on the user inputs. The server system is further caused to prepare a nested hierarchical structure corresponding to the sample target hierarchical schema in a User Interface (UI) representation. The nested hierarchical structure comprises a plurality of nodes with corresponding identifiers of the plurality of identifiers. The server system is further caused to perform an Artificial Intelligence (AI) based mapping of the plurality of columns of the flattened schema to respective nodes of the plurality of nodes of the nested hierarchical structure. The server system is further caused to generate a target hierarchical schema based on the AI based mapping.

In yet another embodiment, a system is disclosed. The system includes a database, a user interface (UI) module, a cataloguing module, an auto-map inference engine, and an executing module. The database is configured to store a plurality of schemas. The user interface (UI) module is in communication with the database. The user interface module is configured to present one or more UIs for facilitating automated conversion of a flattened schema selected from the plurality of schemas into a hierarchical schema. The cataloguing module is in communication with the UI module. The cataloguing module is configured to generate and examine a sample target hierarchical schema. The auto-map inference engine is in communication with the cataloguing module. The auto-map inference engine is configured to perform mapping of columns of the selected flattened schema to nodes of the sample target hierarchical schema. The executing module is in communication with the UI module and the auto-map inference engine. The executing module is configured to perform conversion of the flattened schema to a target hierarchical schema based on the mapping performed by the auto map inference engine.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide a method and a system for mapping a flattened structure to a relationship preserving hierarchical structure.

An embodiment provides a method and a system for mapping a flattened structure to a relationship preserving the hierarchical structure. A user may use a dedicated schema converting application presented at a device associated with the user for selecting a flattened schema that he/she needs to convert to a hierarchical schema. The schema converting application may convert the selected flattened schema to the hierarchical schema or vice versa. The flattened schema is generally represented as a single table comprising a plurality of columns for storing data. The hierarchical schema is represented using a nested structure and comprises a plurality of nodes for storing data. The nodes of the hierarchical schema have relationship between the nodes, and the nodes are arranged in such a way that they maintain a tree-like structure or a parent-child relationship.

For converting the flattened schema to the hierarchical schema, a sample target hierarchical schema in accordance with a target hierarchical schema is defined by the schema converting application. The schema converting application may define the sample target hierarchical schema based on user inputs. The user inputs may include identifiers (ids) for parent and child nodes. Further, the schema converting application may prepare a nested hierarchical structure corresponding to the sample target hierarchical schema. The nested hierarchical structure may comprise a plurality of nodes with corresponding identifiers and their relationships.

Once the nested hierarchical structure is prepared for the sample target hierarchical schema, the schema converting application may perform artificial intelligence (AI) based mapping of the plurality of columns of the flattened schema with the plurality of nodes provided in the nested hierarchical structure of the sample target hierarchical schema. Once the mapping is done, the target hierarchical schema is generated by the schema converting application based on the AI based mapping.

It must be noted that the terms 'schema' and 'structure' have been used interchangeably throughout the description and these terms refer to the organization of data as a blueprint of how the database is constructed.

Various embodiments of the schema converting application are explained with reference to FIGS. 1-7.

Figure 1:
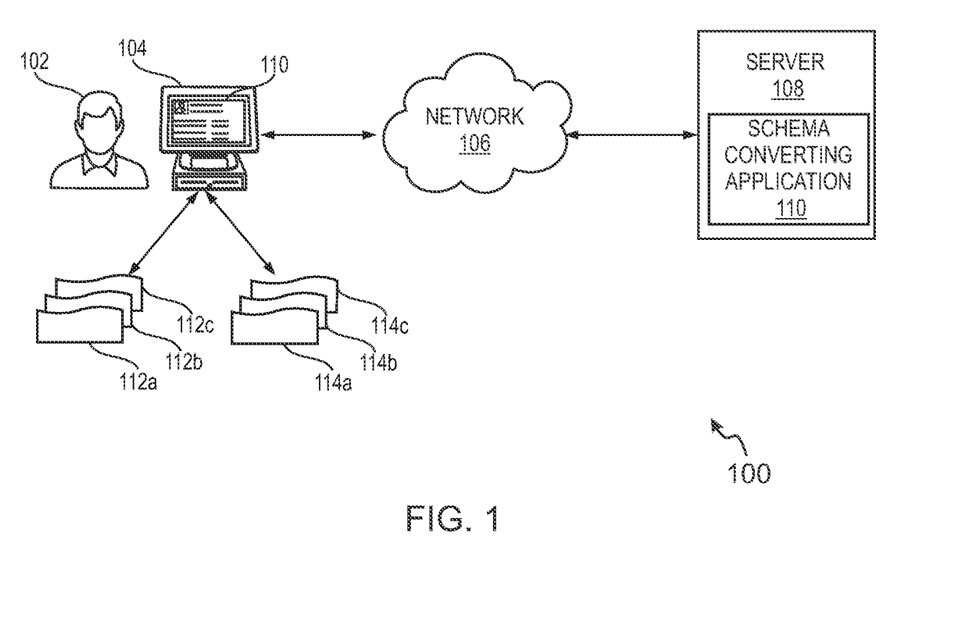
FIG. 1 is an illustration of an environment related to at least some example embodiments.

FIG. 1 is an illustration of an environment 100 related to at least some example embodiments of present disclosure. The environment 100 includes a wireless communication network (e.g., a network 106) that connects entities such as a user 102 and a server 108. The user 102 is depicted to be associated with an electronic workstation device 104 (hereinafter referred to as a 'user device 104'). The user device 104 may be any computing device such as a workstation, a personal computer, smartphones, or computing devices typically used in an enterprise. The user device 104 may be capable of being connected to the network 106.

In at least one example embodiment, the user device 104 is equipped with a schema converting application 110 that facilitates conversion of a flattened schema (e.g., flattened schemas 112a, 112b, 112c) to corresponding target hierarchical schema (e.g., hierarchical schemas 114a, 114b, 114c). The user device 104 may be any communication device having hardware components for enabling User Interfaces (UIs) of the schema converting application 110 to be presented on the user device 104. In an embodiment, the user 102 may access the schema converting application 110 for selecting a flattened schema from a plurality of available schemas that he/she needs to convert to a nested/hierarchical schema. The flattened schema may comprise a plurality of columns for defining data of the flattened schema. The user 102 may also provide a plurality of user inputs using the UI of the schema converting application 110. The user inputs are used by the schema converting application 110 for preparing a sample target hierarchical schema. The plurality of user inputs may include one or more parent IDs and one or more child IDs to be used by the schema converting application 110 to define a plurality of nodes of the sample target hierarchical schema. In an embodiment, the plurality of nodes may define a plurality of data fields in a tree structure of the sample target hierarchical schema.

The schema converting application 110 rests at the server 108. In an embodiment, the server 108 is configured to host and manage the schema converting application 110 and communicate with device, such as the user device 104 using the network 106. Examples of the network 106 include stand alone or a combination of a local area network (LAN), a wide area network (WAN), wireless, wired, any currently existing or to be developed network that can be used for communication. More specifically, an example of the network 106 can be the Internet which may be a combination of a plurality of networks. In another embodiment, the server 108 provides a software application, herein referred to as the schema converting application 110, in response to a user request received from the user device 104 via the network 106. The user device 104 may access an instance of the schema converting application 110 from the server 108 for installing it on the user device 104.

The schema converting application 110 is configured to automatically convert the flattened schema to a target hierarchical schema. The schema converting application 110 may define the sample target hierarchical schema using the user inputs provided by the user 102. A nested hierarchical structure corresponding to the sample target hierarchical schema may displayed to the user 102 on the UI of the schema converting application 110. The nested hierarchical structure may comprise a plurality of nodes with corresponding identifiers (IDs). Simultaneously, the flattened schema selected by the user 102 that needs to be converted may also be displayed to the user on the UI of the schema converting application 110. In an embodiment, the nested hierarchical structure and the flattened schema may be displayed to the user 102 in a user experience (UX) friendly manner.

Further, the schema converting application 110 performs an Artificial Intelligence (AI) based mapping of the plurality of columns of the flattened schema to respective nodes of the plurality of nodes defined in the nested hierarchical structure. In a non-limiting embodiment, the AI based mapping includes a two step process i.e. modeling and inference to be described herein later with reference to FIG. 3. Once the mapping is done, the schema converting application 110 may display the generated target hierarchical schema.

Figure 7:
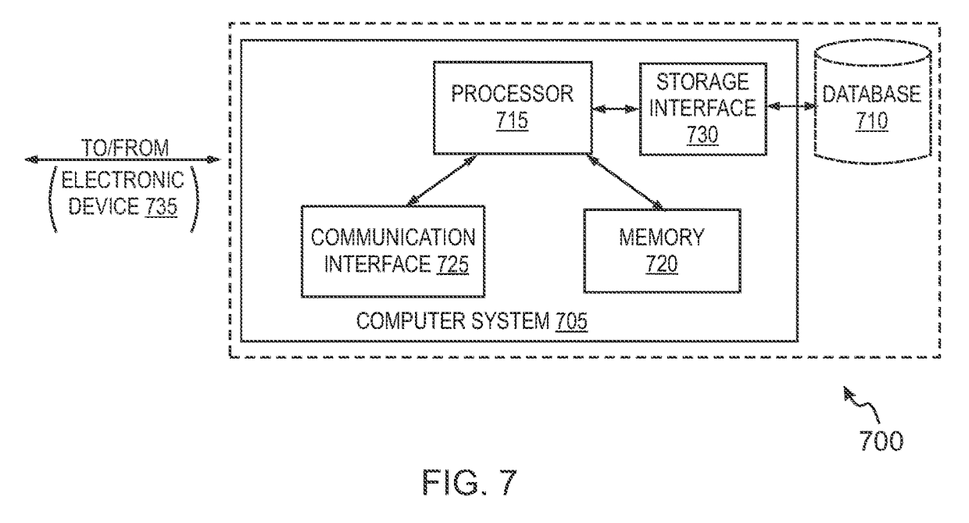
FIG. 7 is a simplified block diagram representation of a server of FIG. 1, in accordance with an example embodiment.

It is noted that the instructions (or the executable code) configuring the schema converting application 110 are stored in a memory of the server 108, and the instructions are executed by a processor (for example, a single-core or a multi-core processor) included within the server 108, as is exemplarily shown with reference to FIG. 7. Accordingly, even though the various functionalities for automatically converting the flattened schema to a hierarchical schema are explained with reference to or being performed by the schema converting application 110, it is understood that the processor in conjunction with the code in the memory is configured to execute the various tasks as enabled by the instructions of the schema converting application 110.

The various components of the schema converting application 110 are further explained with reference to FIG. 2.

Figure 2:
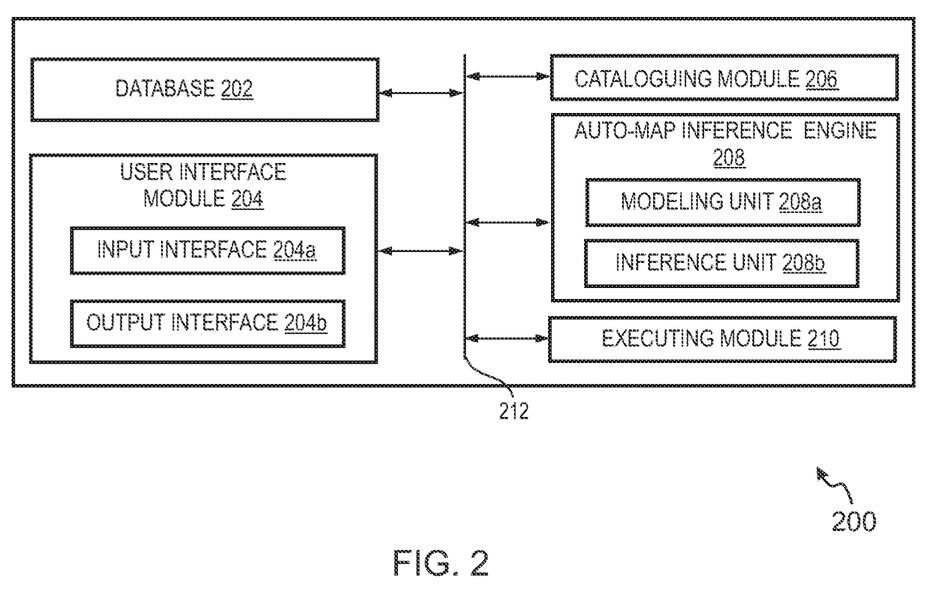
FIG. 2 is block diagram of a system for mapping a flattened structure to a relationship preserving hierarchical structure, in accordance with an example embodiment.

FIG. 2 is a block diagram of a system 200 for mapping a flattened structure to a relationship preserving hierarchical structure, in accordance with an embodiment. The system 200 may be embodied in a server, such as the server 108 or an electronic device, such as, the user device 104. The system 200 enables the user to automatically convert the flattened structure/schema into the hierarchical structure/schema. The system 200 includes a database 202, a user interface (UI) module 204, a cataloguing module 206, an auto-map inference engine 208, and an executing module 210. The auto-map inference engine 208 further comprises a modeling unit 208a and an inference unit 208b.

In an embodiment, the database 202 is configured to store a plurality of schemas. The plurality of schemas can be flattened schemas, hierarchical schemas or any other type of schemas that may serve as models or reference schemas or subject schemas that need to be converted.

The user interface module 204 is in communication with the database 202. The user interface module 204 is configured to present one or more UIs for facilitating automated conversion of the flattened structure/schema into the hierarchical structure/schema. The UI module 204 includes an input interface 204a and an output interface 204b. The input interface 204a is configured to receive a user request for selecting an input schema such as a flattened schema. The flattened schema may be selected from the plurality of schemas stored in the database 202. The input interface 204a is also configured to receive a plurality of user inputs. In an embodiment, the plurality of user inputs may comprise one or more parent IDs and one or more child IDs that may be required for defining the sample target hierarchical schema. Examples of the input interface 204a may include, but are not limited to, a keyboard, a mouse, a joystick, a keypad, a touch screen, soft keys, and the like. The output interface 204b is configured to display a nested hierarchical structure corresponding to the sample target hierarchical schema, and the flattened schema selected by the user. Examples of the output interface 204b may include, but are not limited to, a display such as a light emitting diode display, a thin-film transistor (TFT) display, a liquid crystal display, an active-matrix organic light-emitting diode (AMOLED) display, and the like.

The cataloguing module 206 is in communication with the UI module 204. The cataloguing module 206 is configured to generate the sample target hierarchical schema using the user inputs provided through the input interface 204a. The cataloguing module 206 is configured to examine the sample target hierarchical schema to determine or build a map of hierarchy between various fields and their types in a tree structure of the hierarchical schema. The hierarchy comprises the information about the identifiers (e.g., the parent identifiers, child identifiers etc.) and their relationships. The cataloguing module 206 is also configured to generate the nested hierarchical structure corresponding to the sample target hierarchical schema using the map of hierarchy (information about the identifiers and their relationships) while preserving the relationships between the nodes of the sample target hierarchical schema.

The UI module 204 is configured to receive inputs from the cataloguing module 206 and is configured to render both the flattened schema and the hierarchical schema in a UI. The UI module 204 and the cataloguing module 206 are communicably tied with each other such that any changes made by the user through UI of the cataloguing module 206 can be effectively represented by in a UI offered by the UI module 204. The UI module 204 is also configured to provide a way to automatically detect errors, warnings in the represented sample target hierarchical schema and/or a nested hierarchical structure, for user inspection.

In an embodiment, the auto-map inference engine 208 is in communication with the cataloguing module 206. The auto-map inference engine 208 is configured to generate mapping information i.e. one to one mapping intelligence information for mapping of the columns of the selected flattened schema to nodes of the nested hierarchical structure. The auto-map inference engine 208 generates the mapping information based on artificial intelligence (AI) based mapping, where the AI based mapping includes neural machine translation techniques.

In an embodiment, the auto-map inference engine 208 infers the mappings between the input schema (i.e. the flattened schema) and sample target hierarchical schema in two stages by a modeling unit 208a and an inference unit 208b. In the first stage, the modeling unit 208a is configured to automatically translate the plurality of columns of the flattened schema into a generic hierarchical schema using a neural machine translation technique. Without limiting to the scope of the present disclosure, the generic hierarchical schema can have an example in form of an experience data model (XDM) schema. Without limiting to the scope of present invention, the neural machine translation technique uses two models (a first model and a second model) that take information associated with the plurality of columns as input and translates them into the generic hierarchical schema. The first model may use column names, alias for the column names, and data types of the column as input and the second model may use data stored in the plurality of columns as input. It should be noted that the translation herein represents one to one mapping in schemas. In an embodiment, a crawler in the modeling unit 208a goes through all the previously marked mappings between the flattened and hierarchical schemas. This information is used as data, and the input to the column modeling process is the flattened metadata information such as customer.name or customer.ID (where name and ID are examples of flattened schema elements). With the metadata information, the modeling unit 208a gets column datatype and column aliases, and the number of features can be extended as required. The output of the modeling process relates to the hierarchical schema such as Customer.person.details.ID and Customer.person.details.name. Based on the data, in the second stage, the inference unit 208b computes the consensus and weights of the flattened data and hierarchical field occurring together. For instance, actual data that are related to flattened schema for columns such as name and ID are mapped to the hierarchical schema. Once the model has been trained, the inference unit 208b queries these models using batch beam search, when similar flattened column metadata and column data are given as input to the infer the hierarchical field.

In the second stage, the inference unit 208b is responsible for performing the inference of the mapping. The inference unit 208b is configured to perform the beam search in hierarchical structures of the first and the second models to determine a reliable path in one of the first and the second models. In an example, '2' models may have been built, for example, for datatypes, column names and actual data. The inference unit 208b determines the probabilities associated with the 2 models and chooses a model (among the 2 models) that maximizes the likelihood of reliable mapping. In an example embodiment, the inference unit 208b uses a beam search technique to infer top probable schema at each time step. In an example, multiple columns may be mapped simultaneously. For instance, the inference unit 208b may use the batch beam search to reduce the number of inferences. For a list of column data as input, the column information contains the column name and alias for one model and column sample data for another model.

In at least one example embodiment, the first stage i.e. mapping can be viewed as a neural machine translation problem, where the input is flattened schema information such as column names, data types of the column and data stored in the plurality of columns, and the output is the required hierarchical schema. The mapping generated can be viewed as a sequence of token to represent structure of the required hierarchical schema. The generated mapping is a sequence with highest conditional probability which follows the formula:

$$F(y_0, y_1, \ldots, y_n | X, S, D) = F(y_0, y_1, \ldots, y_{n-1} | X, S, D) *$$
$$F(y_n | X, S, D, y_0, y_1, \ldots, y_{n-1})$$
$$= \pi_{i=1}^{n} F(y_i | X, S, D, y_0, \ldots y_i)$$

Where $y_n$ is the nth token generated,
X is column name,
S is sample data, and
D is data type.

The sample data is used as input and is treated as a string. The string is then tokenized into a plurality of tokens. Further, a word embedding technique is used to encode these tokens into a feature vector. In the second stage i.e. the inference stage, a probability distribution is generated at each step over the string based on the data stored in the plurality of columns and the token generated. The probability distribution helps in finding the sequence with highest probability.

In an example, the inference unit 208b first pre-processes and tokenizes the inputs into two lists, where a list of data is prepared for each model. Thereafter, the inference unit 208b creates a list of priority queues for each column as beam search candidates (e.g., Top K probable). For each beam step, the inference unit 208b first goes through all the queues in order until it finds a certain number of candidates for the first model. Then, the inference unit 208b extracts data and create a batch input for this time step. Similar process is executed for the another model, and this cycle is repeatedly performed until either all the candidates in queue are empty or all the response queue is full.

The reliable path may establish a relationship between every two nodes of the plurality of nodes of the hierarchical structure and may map the information of each column of the plurality of columns of the flattened schema into the hierarchical structure. It should be appreciated by those skilled in the art that usage of the beam search by the inference unit 208b speeds up the search process in case the hierarchical structure is very large. This is because of the fact that the beam search can perform the search for only few branches with high scores in the hierarchical structure which reduces the inference time.

The executing module 210 is in communication with the UI module 204 and the auto-map inference engine 208. The executing module 210 is configured to receive an output (one to one mapping intelligence information for mapping) generated by the auto-map inference engine 208. The output may be provided by the auto-map inference engine 208 in form of flattened dataset comprising all the mappings. The flattened dataset may be presented using a comma separated value (CSV) file. The executing module 210 is also configured to run a Spark job on the received flattened dataset (CSV file) to create an input data frame. Further, a spark data frame application programming interface (API) is called by the executing module 210 to convert the input data frame into a nested data frame using custom translation. Finally, the nested data frame is represented as hierarchical structure files which is the hierarchical schema for the inputted flattened schema.

The database 202, the user interface module 204, the cataloguing module 206, the auto-map inference engine 208, the executing module 210 may be configured to communicate with each other via or through the centralized circuit system 212. The centralized circuit system 212 may be various devices configured to, among other things, provide or enable communication between the components (202-210) of the system 200. In certain embodiments, the centralized circuit system 212 may be a central printed circuit board (PCB) such as a motherboard, a main board, a system board, or a logic board. The centralized circuit system 212 may also, or alternatively, include other printed circuit assemblies (PCAs) or communication channel media. In some embodiments, the centralized circuit system 212 may include appropriate storage interfaces to facilitate communication among the components (202-210). Some examples of the storage interface may include, for example, an Advanced Technology Attachment (ATA) adapter, a Serial ATA (SATA) adapter, a Small Computer System Interface (SCSI) adapter, a RAID controller, a SAN adapter or a network adapter.

Figure 3:
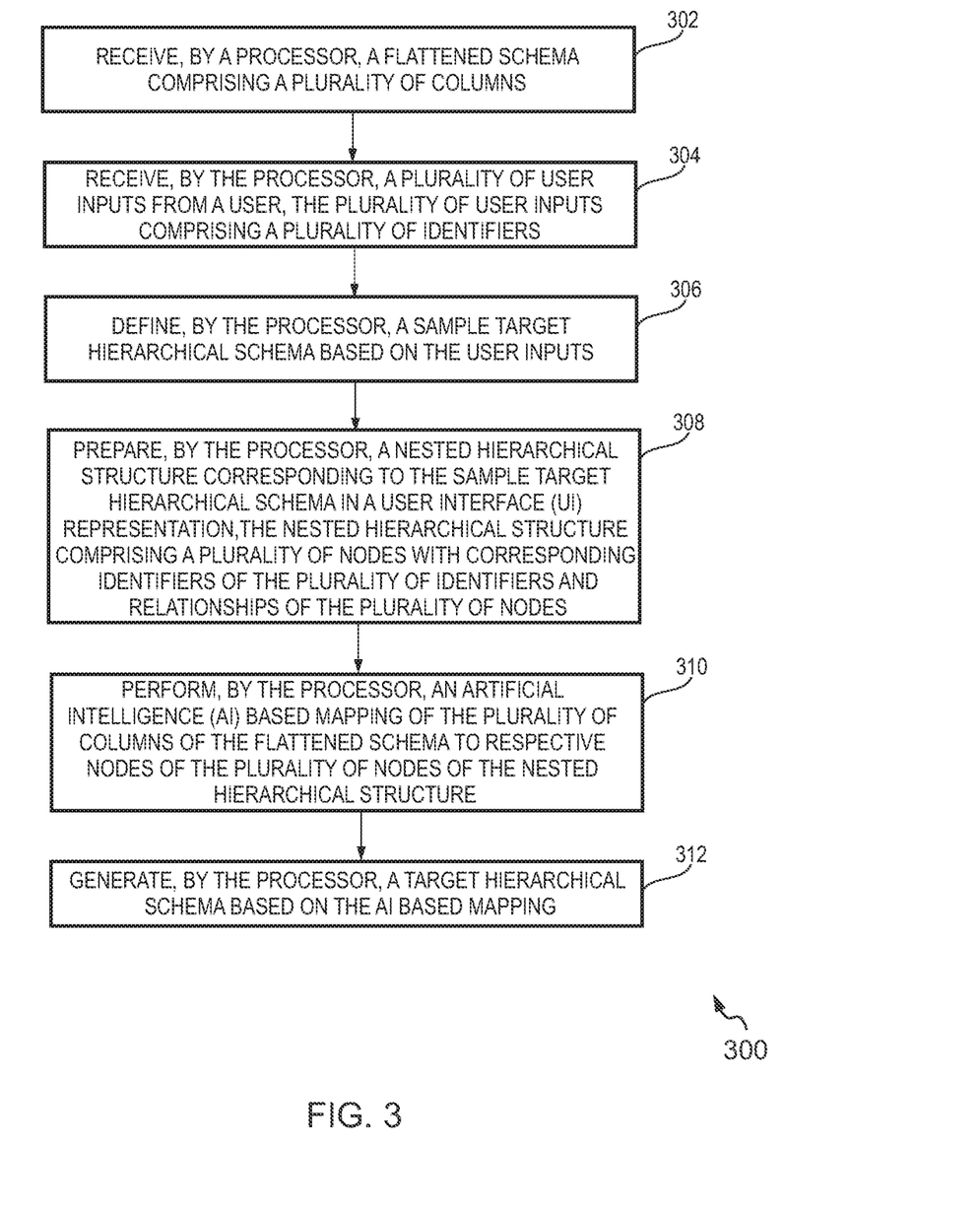
FIG. 3 is a flowchart illustrating a method for mapping a flattened schema to a relationship preserving hierarchical schema, in accordance with an example embodiment.

FIG. 3 is a flowchart illustrating a method 300 for mapping a flattened schema to a relationship preserving hierarchical schema, in accordance with an example embodiment. The operations of the method 300 may be carried out by a server such as the server 108, the system 200 or the electronic device 104. The sequence of operations of the method 300 may not be necessarily executed in the same order as they are presented. Further, one or more operations may be grouped together and performed in form of a single step, or one operation may have several sub-steps that may be performed in parallel or in sequential manner.

At operation 302, the method 300 includes receiving, by a processor, a flattened schema comprising a plurality of columns. The flattened schema that needs to be converted to a hierarchical schema is selected from a plurality of schemas available to the user. The schema selection is performed by the user, such as the user 102.

At operation 304, the method 300 includes receiving, by the processor, a plurality of user inputs from the user. The plurality of user inputs comprises a plurality of identifiers such as parent identifiers and child identifiers.

At operation 306, the method 300 includes defining, by the processor, a sample target hierarchical schema based on the user inputs. The sample target hierarchical schema is defined based on user inputs provided by the user. The user inputs comprise identifiers (e.g., parent identifiers (ids) and child identifiers (ids)).

At operation 308, the method 300 includes preparing, by the processor, a nested hierarchical structure corresponding to the sample target hierarchical schema in a user interface (UI) representation. The nested hierarchical structure which may clearly defines the parent-child relationship is prepared for the sample target hierarchical schema. The nested hierarchical structure comprises a plurality of nodes with corresponding identifiers, where there is a relationship between the plurality of nodes.

At operation 310, the method 300 includes performing, by the processor, an artificial intelligence (AI) based mapping of the plurality of columns of the flattened schema to respective nodes of the plurality of nodes of the nested hierarchical structure. Each column of the plurality of columns of the flattened schema is mapped to a node of the plurality of nodes of the nested hierarchical structure using AI, for example using neural machine translation techniques, as explained with reference to FIG. 2.

At operation 312, the method 300 includes generating, by the processor, a target hierarchical schema based on the AI based mapping. The target hierarchical schema is generated based on the mapping of the plurality of columns of the flattened schema to the plurality of nodes of the nested hierarchical structure.

Figure 4:
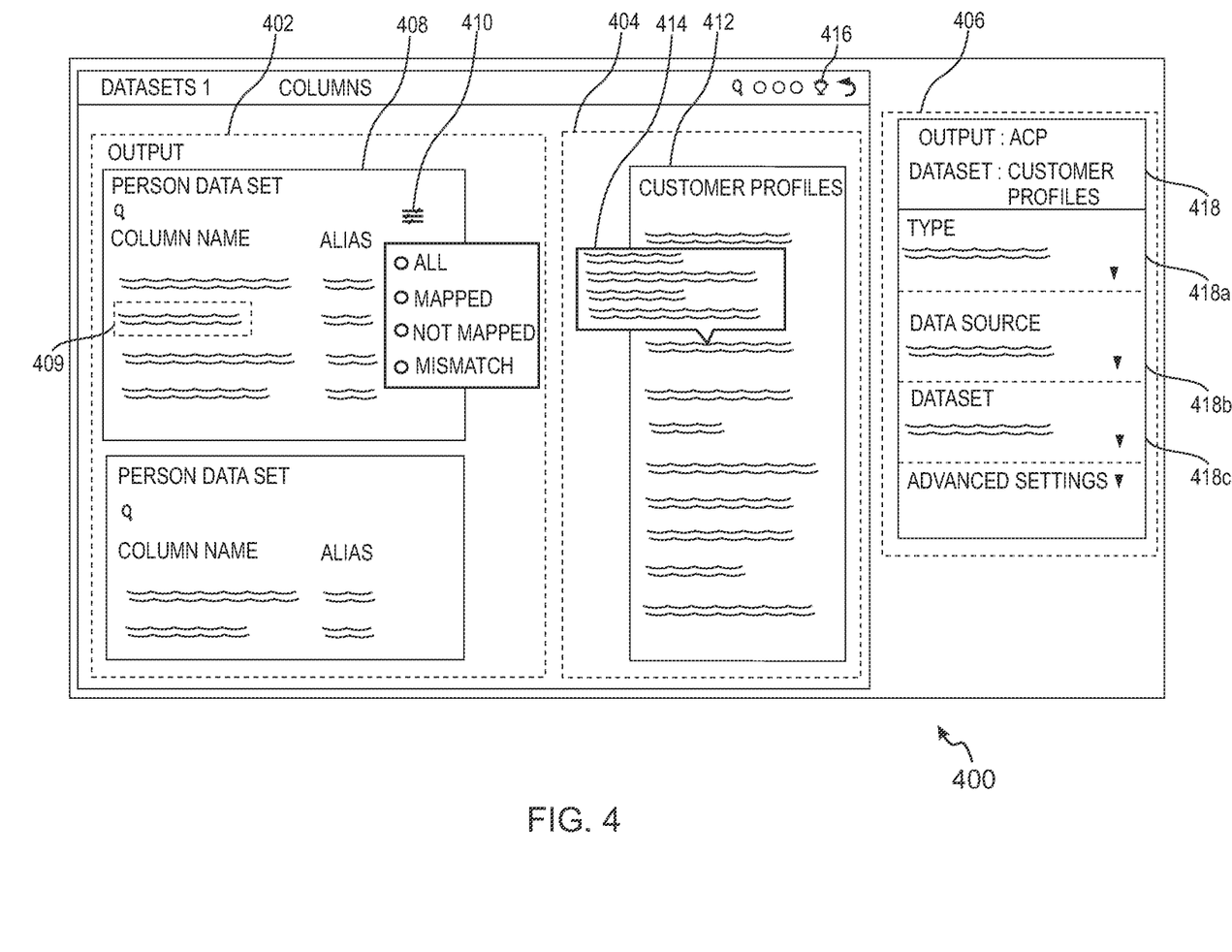
FIG. 4 shows an example representation of a UI for facilitating mapping of the flattened schema to hierarchical schema, in accordance with an example embodiment.

Referring now to FIG. 4, an example representation of a UI 400 for facilitating mapping of the flattened schema to hierarchical schema is shown in accordance with an example embodiment. The UI 400 is presented to a user (e.g., the user 102) using the schema converting application 110 for converting flattened schema to the hierarchical schema.

The UI 400 comprises a left section 402, a mid-section 404 and a right section 406. The left section 402 displays a flattened schema 408 that the user wants to convert into a hierarchical schema. The flattened schema 408 comprises a plurality of columns and a status bar 410. The status bar 410 is provided on top of the flattened schema 408 for facilitating status checking for each column. By clicking on the status bar 410, the user can check the status of a particular column of the plurality of columns available in the flattened schema 408. The status of the particular column can be 'mapped' if the column is mapped in the nested hierarchical structure, 'not-mapped' if the column is yet to be mapped in the nested hierarchical structure or 'mismatch' if no match is available for the column in the nested hierarchical structure. The sub-columns (e.g., see 409) of the flattened schema 408, upon selection, are described in a column section 412 provided in the mid-section 404. In an example, the column section 412 may support up to 10,000 columns. A notification 414 displaying errors or any particular information associated with data type of the column is displayed (e.g., overlaid) over the column section 412. An AI recommendation button 416 is provided above the column section 412 for providing recommendations to user.

Further, the right section 406 of the UI 400 includes an output window 418. The output window 418 can be used by the user for defining details about the format of the output that the user will be receiving using the UI. The output window 418 includes a type section 418a for defining platform at which he/she wants to receive the output, a data source section 418b for defining source of the flattened schema and a dataset section 418c for selecting name of the flattened schema that the user wants to convert.

Figure 5A:
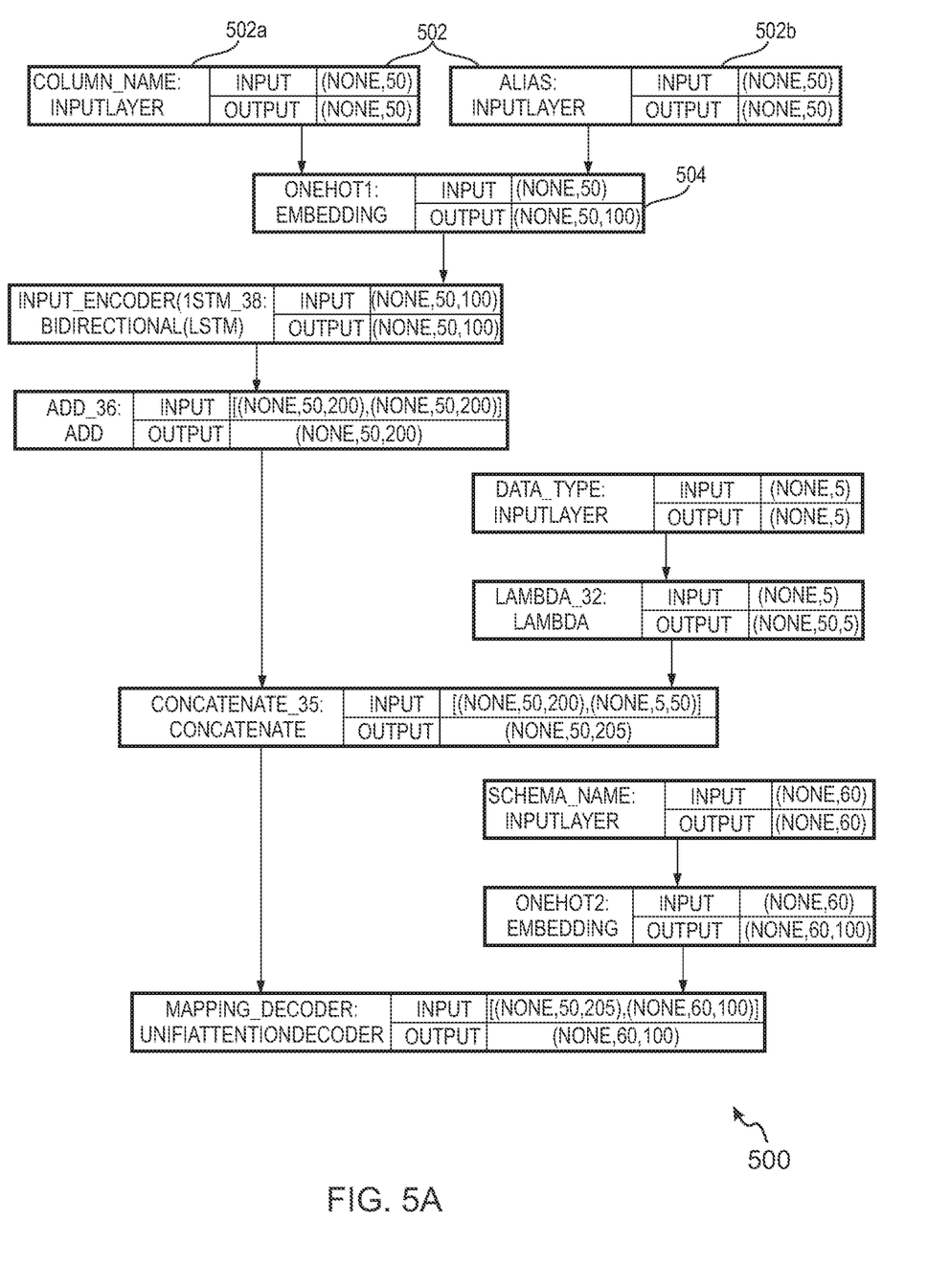
FIG. 5A is a schematic representation illustrating mapping of a column with a node by generating vector of a column metadata, in accordance with an example embodiment.

FIG. 5A is a schematic representation 500 illustrating mapping of a column with a node by generating vector of a column metadata 502, in accordance with an exemplary embodiment of the present disclosure. The column metadata 502 comprise data such as column name and alias shown as 502a and 502b respectively. The column name 502a and alias 502b are encoded into a vector 504. An element wise average is taken for the vector 504 and the element wise average is concatenated with the encoded data type. Further, the encoded information is considered during the inference stage and the output from previous time step (or training history) is considered to make an output prediction using probability distribution.

Figure 5B:
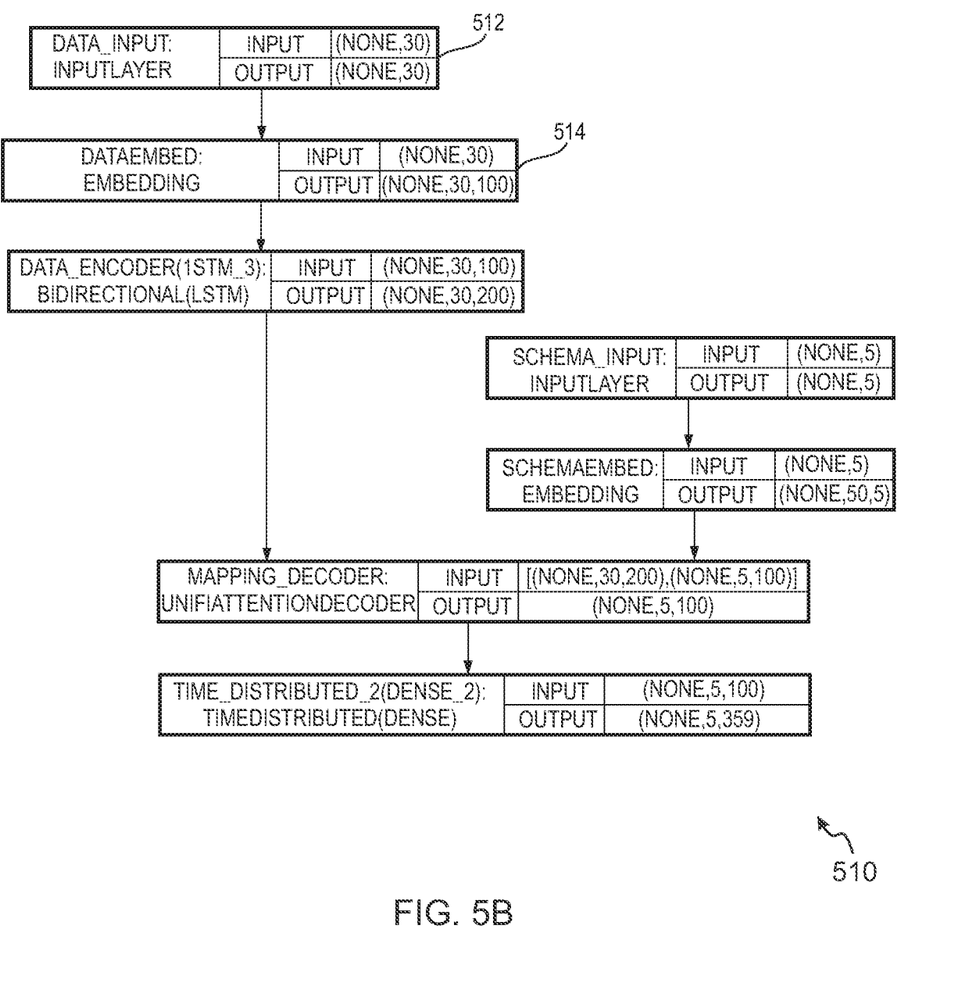
FIG. 5B is a schematic representation illustrating utilization of column sample as information to generate mapping, in accordance with an example embodiment.

FIG. 5B is a schematic representation 510 illustrating the utilization of column sample as information to generate mapping, in accordance with an exemplary embodiment of the present disclosure. The representation 510 utilizes column sample 512 as information to generate mapping. In an embodiment, 'n' number of samples from column are considered and the samples are encoded into 'n' feature vectors 514. Element wise maximum of generated vectors are considered as input for inference stage. Further, the encoded information is considered during the inference stage and the output from previous time step (or training history) is considered to make an output prediction using probability distribution.

Figure 6:
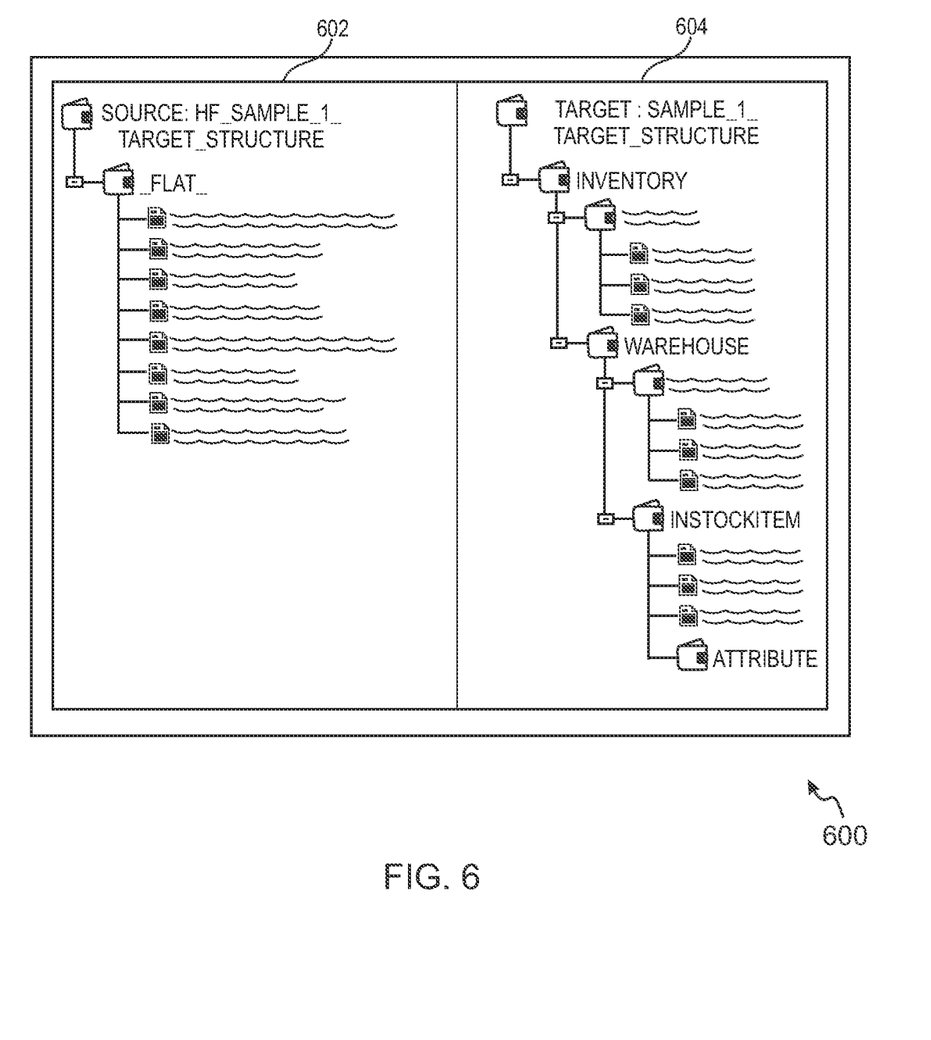
FIG. 6 is a schematic representation of a user interface representing an input flattened dataset with an output hierarchical dataset, in accordance with an example embodiment.

FIG. 6 is a schematic representation of a user interface 600 representing an input flattened dataset and an outputted hierarchical dataset, in accordance with an exemplary embodiment of the present disclosure. The UI is presented on a user device, such as the user device 104. The UI 600 shows the input flattened dataset 602 with that of the output hierarchical dataset 604 that is generated by converting the flattened dataset 602 into the output hierarchical dataset 604 using the schema converting application 110. The output hierarchical dataset 604 is displayed in a tree structure. In one embodiment, the output hierarchical dataset 604 may be a nested dataset.

The disclosed systems and methods with reference to FIGS. 1 to 6, or one or more operations of the flow diagram 300 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

FIG. 7 is a simplified block diagram of a server system 700, in which the schema converting application 110 may be hosted, in accordance with one embodiment of the present disclosure. The server system 700 is an example of the server 108 shown and explained with reference to FIG. 1. The server system 700 includes a computer system 705 and one or more databases, such as a database 710.

The computer system 705 includes a processor 715 for executing instructions. Instructions may be stored in, for example, but not limited to, a memory 720. The processor 715 may include one or more processing units (e.g., in a multi-core configuration). The processor 715 is operatively coupled to a communication interface 725 such that the computer system 705 is capable of communicating with a remote device such as an electronic device 735. Some examples of the electronic device 735 may include but are not limited to the electronic device 104 shown in FIG. 1.

The processor 715 may also be operatively coupled to the database 710. The database 710 is configured to store the schema converting application 110 capable of mapping flattened dataset to hierarchical dataset as explained with reference to FIGS. 1 to 6. The database 710 is any computer-operated hardware suitable for storing and/or retrieving data. The database 710 may include multiple storage units such as hard disks and/or solid-state disks in a redundant array of inexpensive disks (RAID) configuration. The database 710 may include, but not limited to, a storage area network (SAN) and/or a network attached storage (NAS) system.

In some embodiments, the database 710 is integrated within the computer system 705. For example, the computer system 705 may include one or more hard disk drives as the database 710. In other embodiments, the database 710 is external to the computer system 705 and may be accessed by the computer system 705 using a storage interface 730. The storage interface 730 is any component capable of providing the processor 715 with access to the database 710. The storage interface 730 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 715 with access to the database 710.

The memory 720 is a storage device embodied as one or more volatile memory devices, one or more non-volatile memory devices, and/or a combination of one or more volatile memory devices and non-volatile memory devices, for storing micro-contents information and instructions. The memory 720 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

Various example embodiments offer, among other benefits, techniques for establishing a system and a method for mapping flattened structure to a relationship preserving hierarchical structure and thereby eliminate the need of manually performing the mapping process. The new system automates the whole process as the user just have to select the schema that he/she wants to convert, and all other things are taken care by the system automatically. Thereby, using technology of the present disclosure, effective reduction of time that is required for mapping can be achieved.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

The present disclosure is described above with reference to block diagrams and flowchart illustrations of method and system embodying the present disclosure. It will be understood that various block of the block diagram and flowchart illustrations, and combinations of blocks in the block diagrams and flowchart illustrations, respectively, may be implemented by a set of computer program instructions. These set of instructions may be loaded onto a general-purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application and/or implementation without departing from the spirit or scope of the claims.

What is claimed is:

1. A method, comprising:
    receiving, by a processor, a flattened schema comprising a plurality of columns; receiving, by the processor, a plurality of user inputs from a user, the plurality of user inputs comprising a plurality of identifiers;
    defining, by the processor, a sample target hierarchical schema based on the plurality of user inputs;
    preparing, by the processor, a nested hierarchical structure corresponding to the sample target hierarchical schema in a User Interface (UI) representation, the nested hierarchical structure comprising a plurality of nodes with corresponding identifiers of the plurality of identifiers and relationships of the plurality of nodes; performing, by the processor, an Artificial Intelligence (AI) based mapping of the plurality of columns of the flattened schema to respective nodes of the plurality of nodes of the nested hierarchical structure;
    wherein performing the AI based mapping comprises: translating, by the processor, the plurality of columns of the flattened schema into a generic hierarchical schema using a neural machine translation technique, wherein the neural machine translation technique uses a first model and a second model for translation; and performing, by the processor, a search in hierarchical structures of the first and the second model to determine a reliable path in one of the first and the second model; and
    generating, by the processor, a target hierarchical schema based on the AI based mapping.

2. The method as claimed in claim 1, further comprising:
    displaying, by the processor, the nested hierarchical structure on a User Interface (UI) for receiving the plurality of user inputs.

3. The method as claimed in claim 1, wherein the first model takes flattened metadata information of the flattened schema as input and the second model takes data stored in the plurality of columns as input.

4. The method as claimed in claim 3, wherein the flattened metadata information comprises column names, alias for the column names, and data types of the column.

5. The method as claimed in claim 1, wherein performing the search comprises: performing a beam search for determining probabilities associated with the first model and the second model; and choosing a model amongst the first model and the second model that maximizes a likelihood of reliable mapping.

6. The method as claimed in claim 1, wherein generating the target hierarchical schema comprises:
    receiving, by the processor, a flattened dataset comprising the AI based mappings; running, by the processor, a Spark job on the flattened dataset to create an input data frame; and
    calling, by the processor, a spark data frame application programming interface (API) to convert the input data frame into a nested data frame using custom translation, wherein the nested data frame corresponds to the target hierarchical schema.

7. The method as claimed in claim 6, wherein the flattened dataset is presented using a comma separated value (CSV) file.

8. The method as claimed in claim 1, further comprising:
    detecting, by the processor, errors and warnings associated with data types of each column of the plurality of columns of the flattened schema; and displaying, by the processor, the detected errors and warnings.

9. A server system, comprising:
    a memory configured to store instructions; and
    a processor configured to execute the instructions stored in the memory and thereby cause the server system to at least perform:
    receiving a flattened schema comprising a plurality of columns; receiving a plurality of user inputs from a user, the plurality of user inputs comprising a plurality of identifiers;
    defining a sample target hierarchical schema based on the plurality of user inputs; preparing a nested hierarchical structure corresponding to the sample target hierarchical schema in a User Interface (UI) representation, the nested hierarchical structure comprising a plurality of nodes with corresponding identifiers of the plurality of identifiers and relationships of the plurality of nodes; performing an Artificial Intelligence (AI) based mapping of the plurality of columns of the flattened schema to respective nodes of the plurality of nodes of the nested hierarchical structure;

wherein performing the AI based mapping comprises: translating, by the processor, the plurality of columns of the flattened schema into a generic hierarchical schema using a neural machine translation technique, wherein the neural machine translation technique uses a first model and a second model for translation; and performing, by the processor, a search in hierarchical structures of the first and the second model to determine a reliable path in one of the first and the second model; and generating a target hierarchical schema based on the AI based mapping.

10. The server system as claimed in claim 9, wherein for performing the AI based mapping, the server system is further caused to at least:

translate the plurality of columns of the flattened schema into a generic hierarchical schema using a neural machine translation technique, wherein the neural machine translation technique uses a first model and a second model for translation; and perform a search in hierarchical structures of the first and the second model to determine a reliable path in one of the first and the second model.

11. The server system as claimed in claim 10, wherein the first model takes column names, alias for the column names, and data types of the column as input and the second model takes data stored in the plurality of columns as input.

12. The server system as claimed in claim 10, wherein for performing the search, the server system is further caused to at least:

perform a beam search for determining probabilities associated with the first model and the second model; and choose a model amongst the first model and the second model that maximizes a likelihood of reliable mapping.

13. The server system as claimed in claim 9, wherein for generating the target hierarchical schema, the server system is further caused to at least:

receive a flattened dataset comprising the AI based mappings; run a Spark job on the flattened dataset to create an input data frame; and call a spark data frame application programming interface (API) to convert the input data frame into a nested data frame using custom translation, wherein the nested data frame corresponds to the target hierarchical schema.

14. A system, comprising:

a database to store a plurality of schemas; and a user interface (UI) module in communication with the database, the user interface module configured to present one or more UIs for facilitating automated conversion of a flattened schema selected from the plurality of schemas into a target hierarchical schema; a cataloguing module in communication with the UI module, the cataloguing module configured to generate a sample target hierarchical schema based on a plurality of user inputs, the UI module configured to prepare a nested hierarchical structure corresponding to the sample target hierarchical schema in a UI representation, the nested hierarchical structure comprising a plurality of nodes with corresponding identifiers of the plurality of identifiers and relationships of the plurality of nodes; an auto-map inference engine in communication with the cataloguing module, the auto-map inference engine configured to perform mapping of columns of the selected flattened schema to nodes of the sample target hierarchical schema; and an executing module in communication with the UI module and the auto-map inference engine, the executing module configured to perform conversion of the flattened schema to the target hierarchical schema based on the mapping performed by the auto map inference engine, wherein the auto-map inference engine comprises: a modeling unit for automatically translating the columns of the flattened schema into a generic hierarchical schema using a neural machine translation technique, wherein the neural machine translation technique uses a first model and a second model for translation; and an inference unit for performing a search in hierarchical structures of the first and the second model to determine a reliable path in one of the first and the second model.

15. The system as claimed in claim 14, wherein the UI module comprises:

an input interface for receiving a user request for selecting the flattened schema from the plurality of schemas and for receiving a plurality of user inputs; and an output interface for displaying the nested hierarchical structure corresponding to the sample target hierarchical schema.

16. The system as claimed in claim 14, wherein the first model takes flattened metadata information of the flattened schema as input and the second model takes data stored in the plurality of columns as input.

17. The system as claimed in claim 16, wherein the flattened metadata information comprises column names, alias for the column names, and data types of the column.

18. The system as claimed in claim 14, wherein the inference unit is configured to: perform a beam search for determining probabilities associated with the first model and the second model; and choose a model amongst the first model and the second model that maximizes a likelihood of reliable mapping.

* * * * *